US005707702A

United States Patent [19]
Brady, Jr. et al.

[11] Patent Number: 5,707,702
[45] Date of Patent: Jan. 13, 1998

[54] EPOXY PIPELINING COMPOSITION AND METHOD OF MANUFACTURE

[76] Inventors: Robert F. Brady, Jr., 706 Hope La., Gaithersburg, Md. 20878; James D. Adkins, 1272 D Blossom Point Rd., Welcome, Md. 20693

[21] Appl. No.: 673,638

[22] Filed: Jun. 26, 1996

Related U.S. Application Data

[63] Continuation of Ser. No. 355,581, Dec. 14, 1994, abandoned.

[51] Int. Cl.$^6$ .......... F16L 58/10; B32B 1/08; C08G 59/60; C08L 63/07
[52] U.S. Cl. .......... 428/36.9; 523/458; 523/466; 528/111; 528/117
[58] Field of Search ............ 523/458, 466; 528/111, 117; 428/36.9

[56] References Cited

U.S. PATENT DOCUMENTS

| | | | |
|---|---|---|---|
| 4,195,001 | 3/1980 | Lytton | 260/28 R |
| 4,404,243 | 9/1983 | Terpay | 428/62 |
| 4,521,490 | 6/1985 | Pocius et al. | 428/416 |
| 4,814,414 | 3/1989 | Newman-Evans | 428/273 |
| 4,996,279 | 2/1991 | Dewhirst | 528/27 |
| 5,001,193 | 3/1991 | Golden | 525/109 |
| 5,021,537 | 6/1991 | Stark et al. | 528/106 |
| 5,081,168 | 1/1992 | Edwards et al. | 523/466 |
| 5,104,691 | 4/1992 | Edwards et al. | 427/140 |
| 5,118,729 | 6/1992 | Piechocki | 523/404 |
| 5,140,068 | 8/1992 | Siebert et al. | 525/108 |
| 5,141,974 | 8/1992 | Koniski et al. | 523/466 |
| 5,149,730 | 9/1992 | Murata et al. | 523/466 |
| 5,157,077 | 10/1992 | Siebert et al. | 525/108 |
| 5,192,816 | 3/1993 | Iizuka | 523/463 |
| 5,266,257 | 11/1993 | Kildune | 264/224 |
| 5,266,405 | 11/1993 | Kirchmeyer et al. | 428/413 |
| 5,280,068 | 1/1994 | Siebert et al. | 525/108 |
| 5,300,584 | 4/1994 | Farkas | 525/329.3 |
| 5,314,023 | 5/1994 | Dartez et al. | 166/295 |

OTHER PUBLICATIONS

Lee et.al., "Handbook of Epoxy Resins", McGraw–Hill Book Co., New York (Reissue 1982) pp. 10/2–10/5.
Encyclopedia of Polymer Science and Technology, vol. 6, pp. 209–271.
Federation Series on Coatings Technology, Unit Twenty, Epoxy Resins in Coatings, pp. 7–61.
Henkel Corp. Epoxy Curing Agents Catalog.
Pacific Anchor Epoxy Curing Agents and Diluents Catalog.
Shell Products for Waterborne Systems.
Henkel Polymers Division, Epoxy Curing Agents Comparative Performance Properties.
CIBA–GEIGY, Resins and Hardeners Product Guide.

*Primary Examiner*—Donald R. Wilson

[57] ABSTRACT

A cross-linked pipelining network polymer composition for the in situ rehabilitation of pipes is formed. The polymer composition comprises at least one liquid epoxy resin and an effective amount of a liquid curing agent blend comprising an aliphatic polyamine, an aliphatic imidazoline, and an aliphatic amidoamine. The polymer composition may further comprise a pigment, a diluent and/or a viscosity controlling agent.

26 Claims, No Drawings

EPOXY PIPELINING COMPOSITION AND METHOD OF MANUFACTURE

The present application is a continuation application of U.S. Ser. No. 08/355,581, filed Dec. 14, 1994, now abandoned.

BACKGROUND OF THE INVENTION

1. Field of the Invention

This invention relates to a pipelining network polymer composition for the in situ rehabilitation of pipes. The pipelining network polymer composition is used as a lining which protects pipes or other surfaces from corrosion and erosion. The pipelining composition forms a barrier which prevents the leaching of, for example, metals from pipes. This invention further relates to a pipelining composition suitable for use in the rehabilitation of pipes used for transporting fluids such as drinking water. This invention, more particularly, relates to an epoxy resin/curing agent corrosion-resistant network pipelining composition suitable for the in situ rehabilitation and life extension of pipes wherein the pipelining composition has sufficient adhesion (i.e. pass 40 inch-pound ASTM D-2794 test) and a sufficiently quick drying time (e.g. about 50 to about 60 minutes or less) to avoid excessive sagging of the pipelining prior to cure.

2. Detailed Description of the Related Art

Copper-nickel alloys, such as those used in shipboard piping systems, are rapidly destroyed by hydrochloric acid, hydrogen sulfide, sulfuric acid, and other corrosive products of bacterial activity. Excessively high flow rates also erode the metal, thereby causing loss of wall thickness, the leaching of metals into the fluids flowing through such pipes and eventual perforation through the pipe. Contamination is caused by leaching of heavy metals from pipes, solder or other piping materials. An impervious lining serves as a barrier keeping harmful materials, such as lead, from contaminating fluids or other materials carried by such pipes, and extends the useful life of such pipes.

Underground fluid-transporting pipes fracture and corrode with use and age. Repair of a leaking pipe requires excavation, repair and/or replacement of the damaged pipe. This method of replacement or patching of leaks can be very expensive and time consuming. If access to the pipe is blocked by overground structures, excavation of pipes becomes difficult. If the exterior of pipes is coated with asbestos, replacement and/or removal of the asbestos is prohibitively expensive. The use of a suitable corrosion-resistant pipelining network polymer composition would obviate the need to excavate aging pipes because such pipes would be amenable to in situ rehabilitation.

Epoxy linings have been formulated for use as linings for the interior of pipes. The coatings are suitable for pipes which are made of metallic or non-metallic materials and which carry gases, liquids and slurries of solids suspended in fluids. A lining known as Naval Research Laboratory formula 4A (i.e. NRL formula 4A or just 4A) has been used for lining pipes in aircraft carriers since 1988. Because the 4A lining is sensitive to contaminants on the pipe surface to be coated, linings of 4A in pipes sometimes show craters and other film defects. In addition, because 4A lining is brittle, it is easily damaged by an impact on the pipe. NRL formula 4A is formulated using an oligomeric methylene dianiline (MDA) derivative as the curing agent. Due to recent Occupational Safety and Health Agency regulations (OSHA regulations) (i.e. see Federal Register, Vol. 57, No. 154, pp. 35630-35696 (Monday, Aug. 10, 1992—Rules and Regulations), the use of methylene dianiline is now subject to strict medical surveillance. Consequently, NRL formula 4A can no longer be manufactured without meeting very strict regulations on the handling of methylene dianiline. Since the handling of MDA has become subject to strict medical surveillance, it has become necessary to replace NRL formula 4A with a substitute wherein the desirable properties of NRL formula 4A have not been sacrificed. Therefore, it has become necessary to devise a new pipelining for the in situ rehabilitation of pipes wherein an alternative curing agent (i.e. not MDA) is used. It is necessary that any new pipelining formulation be at least as effective as the NRL formula 4A lining.

There is a need for a pipelining that is manufactured without the use of methylene dianiline, or its aromatic derivatives or any aromatic amines. In addition, there is a need for pipelining network polymer that will maintain adhesion to copper-nickel alloys and other piping materials after severe impact (i.e. pass the 40 inch-pound ASTM D-2794 direct impact test). There is a need for a pipelining network polymer which resists attack from fuels, chemicals, acids, bases, sewage and other destructive solids and liquids normally found in ship or industrial waste streams. There is a need for a pipelining network polymer which is safe for contact with drinking water (potable water) from which no materials toxic to human or animal life can be extracted. There is a need to create a pipelining network polymer which provides a barrier to metals, metal ions and other toxic materials within the composition of the pipe and, thereby, prevents such metals, metal ions and other toxic materials from being leached into, for example, fluids being transported through the pipe. There is a need to create a pipelining network polymer which forms a corrosion-resistant barrier to metals, metal ions and other toxic materials, such as, acids, bases or chlorine among others. There is a need to create a pipelining network polymer which may be applied to the interior of a pipe by a turbulent moving stream of air or other gas or propellant system, and which pipelining will cure rapidly in an effective thickness on all interior pipe surfaces before excessive sagging occurs due to gravity or other forces. There is a further need to create a pipelining network polymer which flows out and wets surfaces of imperfectly cleaned metal or other materials to be coated. There is an even further need to form a pipelining network polymer which forms an intact film that is not disturbed or broken by dirt, oil, grease or other foreign matter present on the surface to be coated. There is also a need to form a pipelining network polymer which can readily incorporate a pigment so that areas coated with the pipelining network polymer can be readily distinguished from areas not coated with the pipelining network polymer. All of the above requirements need to be met without the use of methylene dianiline, its aromatic derivatives, or aromatic amines as curing agents. Currently available pipelinings do not meet the above requirements.

SUMMARY OF THE INVENTION

It is therefore an object of the present invention to provide an epoxy pipelining network polymer which does not use methylene dianiline, its aromatic derivatives or aromatic amines as a curing agent.

It is therefore another object of the present invention to provide an epoxy pipelining network polymer which will maintain adhesion to copper-nickel alloys and other piping materials after impact.

It is therefore another object of the present invention to provide a pipelining network polymer which resists attack from fuels, chemicals, acids, bases, sewage, and other destructive solids and liquids normally found in ship or industrial waste streams.

It is therefore another object of the present invention to provide an epoxy pipelining network polymer which is non-toxic and safe for use as a lining in pipes that transport drinking water.

It is therefore another object of the present invention to provide an epoxy pipelining network polymer which is safe for contact with drinking water (i.e. potable water) and from which no materials toxic to human or animal life can leach into water carried therein.

It is therefore another object of the present invention to provide an epoxy pipelining network polymer which provides a barrier to metals, metal ions, and other toxic materials present within the composition of the pipe and which pipelining network polymer prevents such metals etc. from contaminating fluids being transported through the lined pipe.

It is therefore another object of the present invention to provide an epoxy pipelining network polymer which may be applied to the interior of a pipe by a turbulent moving stream of air, or other gas or propellant system and which will cure rapidly in an effective thickness on all interior pipe surfaces before it is removed by gravity or other forces.

It is therefore another object of the present invention to provide an epoxy pipelining network polymer which flows out and wets the surface of imperfectly cleaned metal and other materials to be coated (i.e. piping materials).

It is therefore another object of the present invention to provide an epoxy pipelining network polymer which forms an intact film that is not disturbed or broken by dirt, oil, grease or other foreign matter on the surface of the pipe being coated.

It is therefore another object of the present invention to provide an epoxy pipelining network polymer which optionally may contain a variety of colors or pigments that allow the applicator to distinguish between successive layers of pipelining network polymer coatings.

These and other objects are accomplished by forming an epoxy pipelining by reacting an epoxy resin with a curing agent blend comprising an aliphatic amine curing agent, a polyamide cyclized curing agent and a polyamide curing agent to form the pipelining, wherein the mixed viscosity (i.e viscosity of mixture of epoxy resin and curing agent blend prior to application to pipe or other material to be coated and before cure) of the pipelining can optionally be adjusted by the use of a thixotropic agent and wherein color can optionally be imparted to the pipelining by the use of pigments. It is possible to form a pipelining that is made only of the epoxy resin and the curing agent blend. If necessary, a thixotropic agent and/or a pigment may optionally be added to impart a desired viscosity and/or a desired color, respectively.

DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to epoxy pipelining formulations that impart both practical and optimal properties to the resulting lining. Typical pipelining formulations include by weight specific percentages of curing agent blends and epoxy resins. Preferable formulations include by weight specific percentages of epoxy resins and curing agent blends having viscosity control agents (thixotropic agents). Most preferable formulations include by weight specific percentages of epoxy resins curing agent blends having both viscosity control agents (thixotropic agents) and pigments.

The curing agent blend is further described as comprising an amine curing agent, a polyamide curing agent and a polyamide cyclized curing agent. Polyalkylene amine curing agents are manufactured by the reaction of ethylene and ammonia. It is recognized that a mixture of isomers is produced in this operation as well. The products include linear molecules such as ethylene diamine ($NH_2CH_2CH_2NH_2$; EDA), diethylene triamine ($NH_2CH_2CH_2NHCH_2CH_2NH_2$; DETA), triethylene tetramine ($NH_2CH_2CH_2NHCH_2CH_2NHCH_2CH_2NH_2$; TETA), tetraethylene pentamine ($NH_2CH_2CH_2NHCH_2CH_2NHCH_2CH_2NHCH_2CH_2NH_2$; TEPA), tris-(2-aminoethyl)amine (($NH_2CH_2CH_2)_3N$) and aminoethylpiperazine (AEP), AEP having the structure:

(1a)

The amine curing agents may be selected from the group consisting of ethylene diamine (EDA), diethylene triamine (DETA), triethylene tetraamine (TETA), tetraethylene pentamine (TEPA), pentaethylene hexamine (PEHA) and aminoethyl piperazine (AEP). The linear amine curing agents EDA, DETA, TETA, TEPA and PEHA generally have the structure:

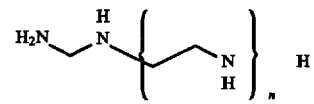

wherein n is an integer equal to 0, 1, 2, 3 or 4, respectively.

Other amine curing agents, typically, have the formula R'—$NH_2$ wherein R' is a saturated hydrocarbon group of 1–25 carbon atoms. In addition, the amine curing agent may be a diamino compound having the structure:

wherein $R^1$, and $R^2$ are saturated hydrocarbons of 1 to 25 carbon atoms.

An exemplary diamino curing agent is 1,2-diaminocyclohexane (1,2-DCH) having the formula:

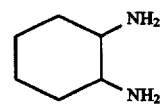

The polyamide curing agents (also referred to as the amidoamine curing agents) are formed by reacting dimer carboxylic acids with primary or secondary amines or by reacting mono-carboxylic acids with polyamines containing primary and/or secondary amine groups. The carboxylic acids reacted with amine curing agents to form the respective amidoamine (and imidazoline curing agents discussed, infra) curing agents may be mono acids or dimer acids having the formula RCOOH or HOOCRCOOH, respectively. In the case of either the mono-acid or the dimer-acid, the R group is a saturated hydrocarbon group of 1–36 carbon atoms. Examples of monoacids used to react with an amine curing agent to form the respective amidoamine curing agent (and the imidazoline curing agent discussed, infra) may be selected from the group consisting of methanoic acid (formic acid, HCOOH), ethanoic acid (acetic acid, $CH_3CO_2H$), propanoic acid (propionic acid, $CH_3CH_2CO_2H$), butanoic acid (butyric acid, $CH_3(CH_2)_2CO_2H$), pentanoic acid (valeric acid, $CH_3(CH_2)CO_2H$), hexanoic acid (caproic acid, $CH_3(CH_2)_4CO_2H$), heptanoic acid (enanthic acid, $CH_3(CH_2)_5CO_2H$), octanoic acid (caprylic acid, $CH_3(CH_2)_6CO_2H$), nonanoic acid (pelargonic acid, $CH_3(CH_2)_7CO_2H$), decanoic acid (capric acid, $CH_3(CH_2)_8CO_2H$), dodecanoic acid (lauric acid, $CH_3(CH_2)_{10}CO_2H$), tetradecanoic acid (myristic acid, $CH_3(CH_2)_{12}CO_2H$), hexadecanoic acid (palmitic acid, $CH_3(CH_2)_{14}CO_2H$), and octadecanoic acid (stearic acid, $CH_3(CH_2)_{16}CO_2H$) among others. A carboxylic acid may react with an amine to form an amidoamine reaction product. Some of the amidoamine reaction products of a carboxylic acid and an amine useful in the present invention have, for example, the following formulas:

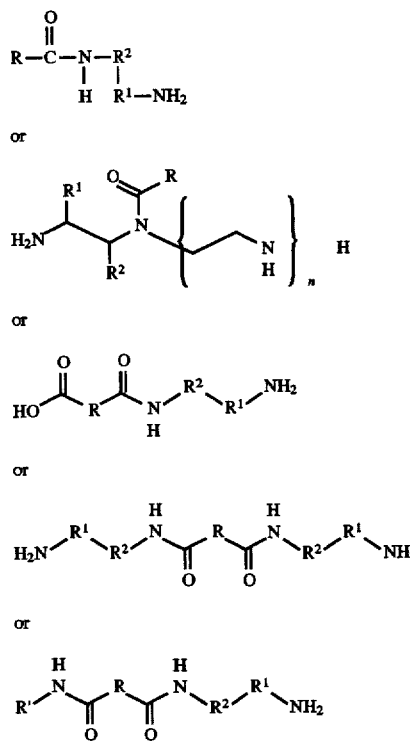

wherein n=0, 1, 2, 3, or 4 and wherein R, R', $R^1$ and $R^2$ are saturated hydrocarbon groups of 1 to 25 carbon atoms, inclusive. Alternatively, R', $R^1$ and $R^2$ may be saturated alkyl amino groups from compounds such as EDA, DETA, TETA, TEPA, PEHA and AEP etc. of 2–25 carbon atoms, inclusive.

The cyclized polyamide curing agent (also referred to as the imidazoline curing agent) is manufactured in three steps from three basic raw materials. Fatty acids, typically, obtained from a variety of vegetable sources such as tung, tall, soya, or safflower oil are dimerized and the resultant dimer acids are reduced with hydrogen to their fully saturated analogs. Alternatively, the fatty acids may be reduced without dimerization, or a blend of the reduced dimer acids and the non-dimerized reduced fatty acids may be employed. It is recognized that a mixture of isomers is produced in all these operations. The acids are reacted with polyalkylamines to form polyamide curing agents. Those polyamide curing agents having a primary or a secondary amine nitrogen which is two carbon atoms removed from the amide nitrogen may be further dehydrated to form the imidazoline curing agents.

The imidazoline curing agents formed, typically, have the formulas:

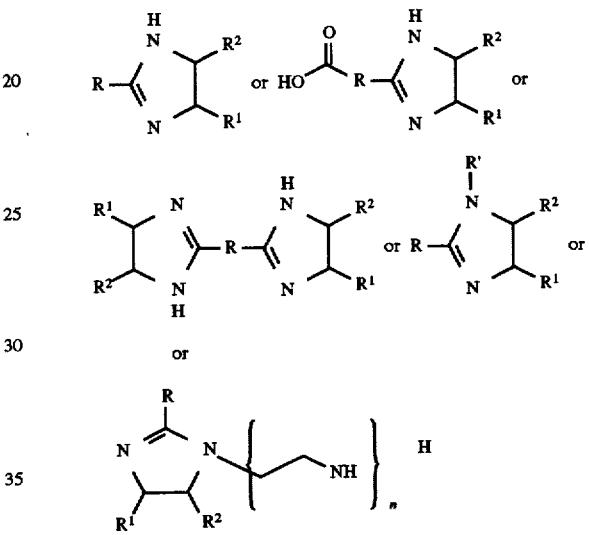

wherein n=0, 1, 2, 3, or 4 and wherein R, R', $R^1$ and $R^2$ are saturated hydrocarbon groups of 1 to 25 carbon atoms, inclusive, and $R^1$ and $R^2$ may alternatively be a H atom. Alternatively, R', $R^1$ and $R^2$ may be saturated alkyl amino groups from compounds such as EDA, DETA, TETA, TEPA, PEHA and AEP etc. of 2–25 carbon atoms, inclusive.

The imidazoline curing agents have several valuable properties which are important for the production of pipelinings. The mild alkaline nature of the exemplary imidazoline curing agent, such as (2), infra, passivates metals and retards the corrosion of metals. The exemplary imidazoline curing agent (2), infra, possesses a long nonpolar hydrocarbon chain {–R} and also a polar imidazoline ring; thus, it has the properties of a surfactant. Such an exemplary imidazoline curing agent such as (2), infra, is able to lift dirt, oil and other impurities from the surface to be coated, enabling a wet film to spread evenly over the surface to be coated. (Note also that an exemplary surface to be coated is a Cu—Ni alloy having a 70 (Cu)/30 (Ni) or 90(Cu)/10 (Ni) composition.)

The reduced dimer acid, reduced fatty acid, or blend of acids (e.g. compound (1a), infra) is heated with the exemplary mixture of polyalkylene amines (e.g. compound (3a), infra). Reaction between one acid group and one primary or secondary amine leads to the elimination of a molecule of water and the formation of an amide linkage (e.g. as shown in exemplary compounds (4) and (4a), infra). When heating is prolonged, a primary or secondary amine which is two carbon atoms removed from the amide nitrogen reacts with the amide carbonyl oxygen, a second molecule of water is removed and an imidazoline ring is formed as seen in exemplary compounds (2) and (2a), infra.

of one or more epoxy resins and one or more pigments. Preferably, the curing agent blend comprises one or more amine curing agents, one or more imidazoline curing agents,

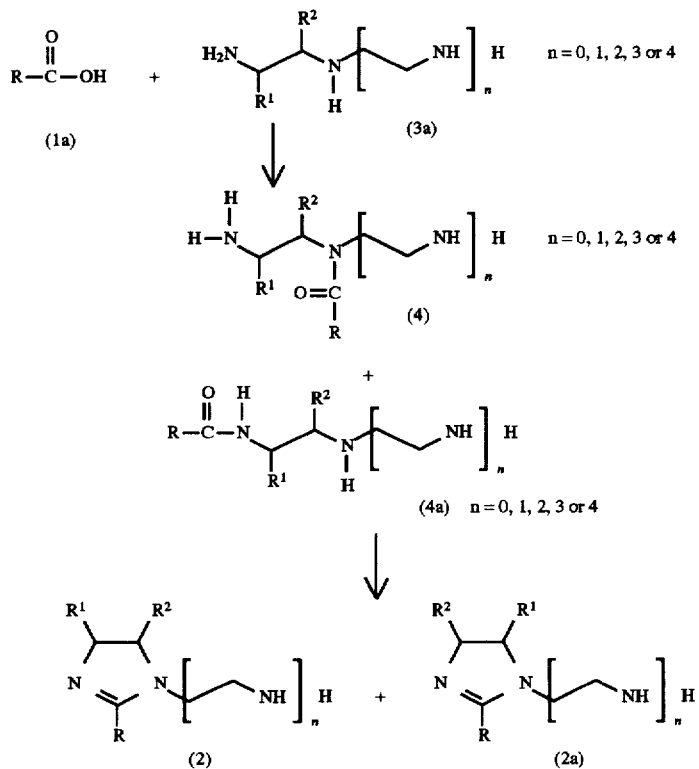

Both of the reactions shown above occur many times and the exemplary reaction products (4) and (4a) contain a significant percentage of imidazoline rings (e.g. as seen in exemplary products (2) and (2a)), between about 10–90%, inclusive.

As noted, the curing agent blend comprises an amine curing agent, a polyamide cyclized curing agent (also referred to as an imidazoline curing agent) and a polyamide curing agent (also referred to as an amidoamine curing agent). In addition to the amine curing agent, the imidazoline curing agent and the amidoamine curing agent, the curing agent blend may further comprise benzyl alcohol (e.g. an exemplary reactive diluent), unreacted amines, unreacted reduced dimer acids (e.g. HOOC—R—COOH), unreacted reduced fatty acids (e.g. RCOOH) or a blend of unreacted mono and dimer acids. In addition, the curing agent blend may further comprise (along with the amine curing agent, the imidazoline curing agent, the amidoamine curing agent and the unreacted mono and dimer acids) one or more pigments, one or more viscosity controlling agents and a small amount of one or more epoxy resins.

Typically, the curing agent blend comprises one or more amine curing agents, one or more imidazoline curing agents, one or more amidoamine curing agents and one or more reactive diluents. More typically, the curing agent blend comprises one or more amine curing agents, one or more imidazoline curing agents, one or more amidoamine curing agents, one or more reactive diluents and a small amount of one or more epoxy resins. Most typically, the curing agent blend comprises one or more amine curing agents, one or more imidazoline curing agents, one or more amidoamine curing agents, one or more reactive diluents, a small amount of one or more amidoamine curing agents, one or more reactive diluents, a small amount of one or more epoxy resins, one or more pigments and one or more viscosity controlling agents.

In addition the curing agent blend may comprise one or more amine curing agents, one or more imidazoline curing agents, one or more amidoamine curing agents, one or more reactive diluents and a small amount of one or more epoxy resins. The optional pigment and/or the optional viscosity controlling agents may preferably be added to the epoxy resin component (component A, infra, at Example 1) instead of to the curing agent blend component (component B, infra, at Example 1).

For example, the curing agent blend may comprise 1,2-diaminocyclohexane (1,2-DCH) as the amine curing agent, one or more imidazoline curing agents, one or more amidoamine curing agents, benzyl alcohol as a reactive diluent, and a small amount of an epoxy resin such as DGEBA (the diglycidyl ether of bisphenol A; see infra page 38) and/or DGEBF (the diglycidyl ether of bisphenol F; see infra page 38). Typically, an exemplary curing agent blend comprises about 1–70 mole % of the amine curing agent, about 0.1–40 mole % of the imidazoline, about 5–95 mole % of the amidoamine, about 0–35 mole % of the reactive diluent, and about 0–10 mole % of the epoxy resin, inclusive, respectively. More typically, an exemplary curing agent blend comprises about 2–69 mole % of the amine curing agent, about 0.5–35 mole % of the imidazoline, about 6–90 mole % of the amidoamine, about 2–30 mole % of the reactive diluent, and about 0–9 mole % of the epoxy resin, inclusive, respectively. Most typically, an exemplary curing agent blend comprises about 3–68 mole % of the amine curing agent, about 0.75–30 mole % of the imidazoline, about 7–85 mole % of the amidoamine, about 3–25 mole % of the reactive diluent, and about 0–8 mole % of the epoxy resin, inclusive, respectively. Preferably, an exemplary curing agent blend comprises about 4–67 mole % of the amine curing agent, about 0.8–25 mole % of the imidazoline, about 8–84 mole % of the amidoamine, about 4–24 mole % of the reactive diluent, and about 0–7 mole % of the epoxy resin, inclusive, respectively. More preferably, an exemplary curing agent blend comprises about 5–66 mole % of the amine curing agent, about 0.9–22 mole % of the imidazoline, about 9–83 mole % of the amidoamine, about 5–23 mole % of the reactive diluent, and about 0–6 mole % of the epoxy resin, inclusive, respectively. Most preferably, an exemplary curing agent blend comprises about 6–65 mole % of the amine curing agent, about 1.0–20 mole of the imidazoline, about 10–80 mole % of the amidoamine, about 6–20 mole % of the reactive diluent, and about 0–5 mole % of the epoxy resin, inclusive, respectively. The exemplary curing agent blend of Example 2, infra, contains about 63 mole % of the 1,2 DCH (i.e. the exemplary amine), about 0.08 mole % of the exemplary imidazoline formed from the reaction of palmitic acid and 1,2 DCH followed by cyclization, about 8.3 mole % of the exemplary amidoamine formed from the reaction of palmitic acid and 1,2 DCH, about 22.4 mole % of the benzyl alcohol (i.e. the exemplary reactive diluent), and about 6.26 mole % of the DGEBA wherein x=0 (i.e. the exemplary epoxy resin).

Possible exemplary curing agent blends that are commercially available are Ancamide 2050® (Pacific Anchor Chemical Corporation), Araldite HY 283® (Ciba-Geigy Corporation) and Versamid® 253 (Henkel Corporation).

Composition of pipelinings can be made from a mixture of the part A epoxy resin (DGEBA: Epon® 828, and/or Araldite XU Bis F GY® 281) containing optional pigments such as Titanium Oxide ($TiO_2$ R-960®), red iron oxide (Red Iron Oxide RO-6097®), phthalocyanine blue and/or phthalocyanine green and optional viscosity controlling agents such as silicon dioxide (Cab-O-Sil TS-720®, Cab-O-Sil R 974®) and a part B curing agent blend.

The reaction using an exemplary curing agent blend of compounds (2), (3) and (4), infra, with the exemplary epoxy resin (1), infra, wherein x=0 or 1 to form exemplary pipelining network polymers is shown below:

The structure of polymer (5) wherein x=0 or 1 is given below:

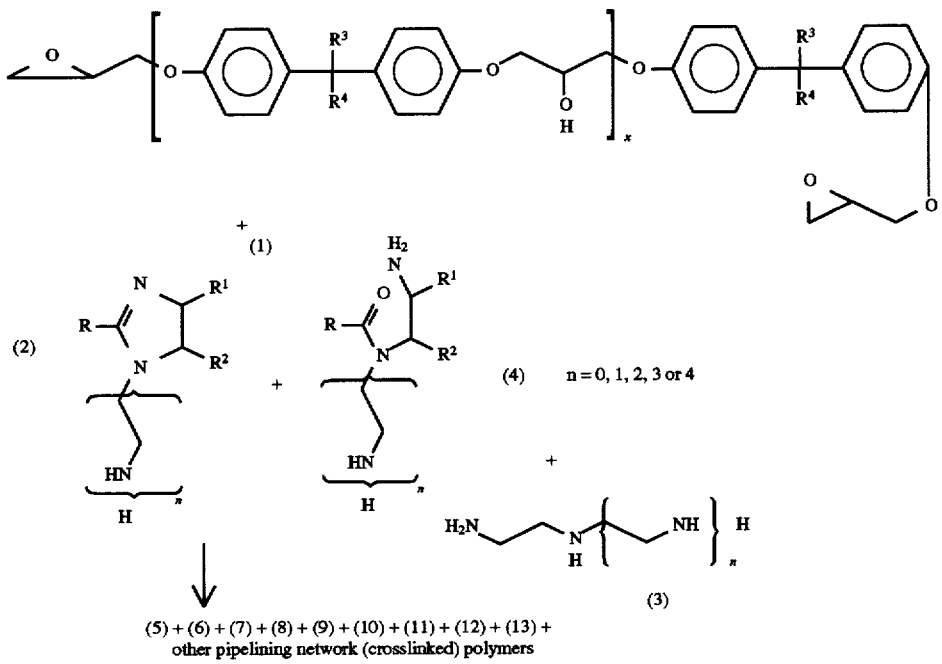

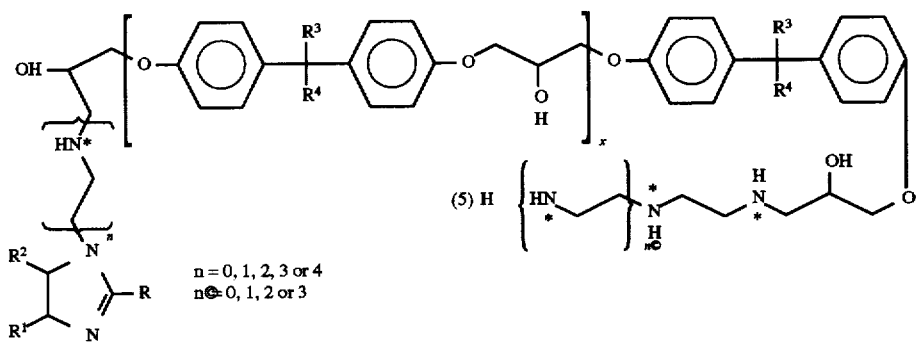
The structure of polymer (6) wherein x=0 or 1 is given below:
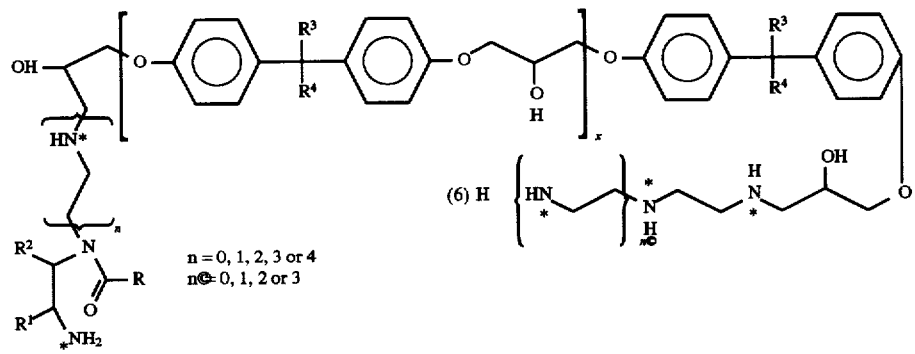
The structure of polymer (7) wherein x=0 or 1 is given below:
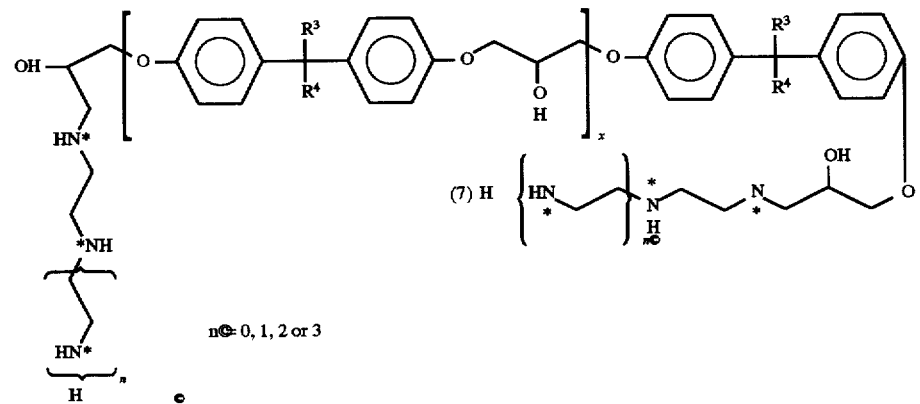
The structure of polymer (8) wherein x=0 or 1 is given below:

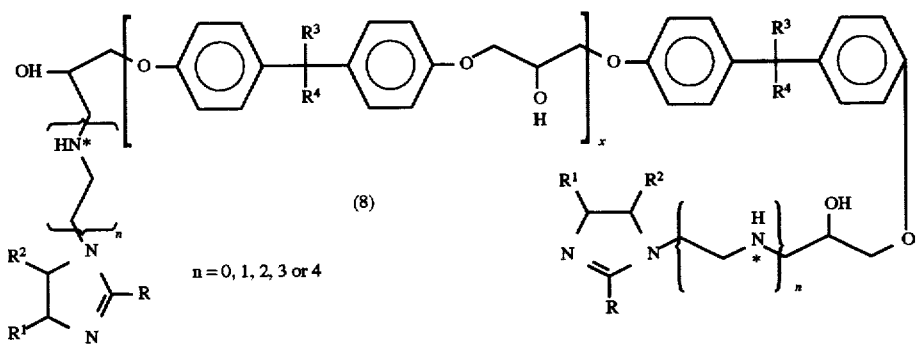
(8)
n = 0, 1, 2, 3 or 4
The structure of polymer (9) wherein x=0 or 1 is given below:
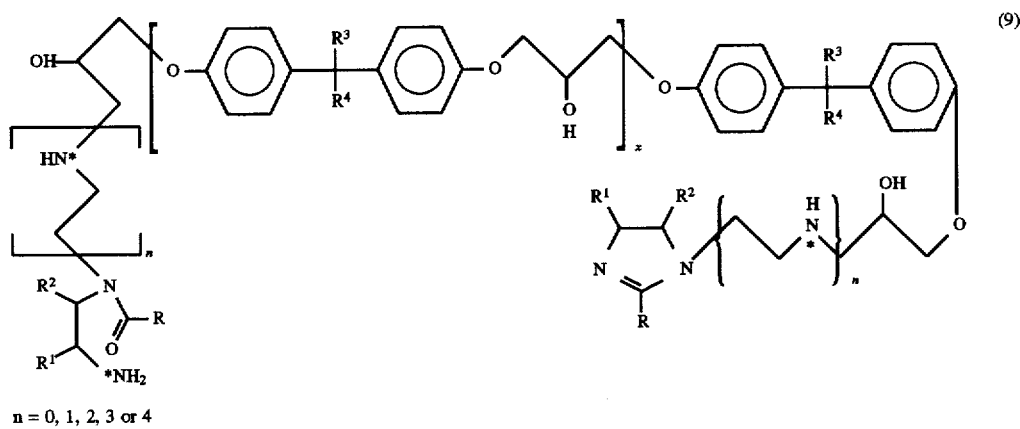
(9)
n = 0, 1, 2, 3 or 4
The structure of polymer (10) wherein x=0 or 1 is given below:
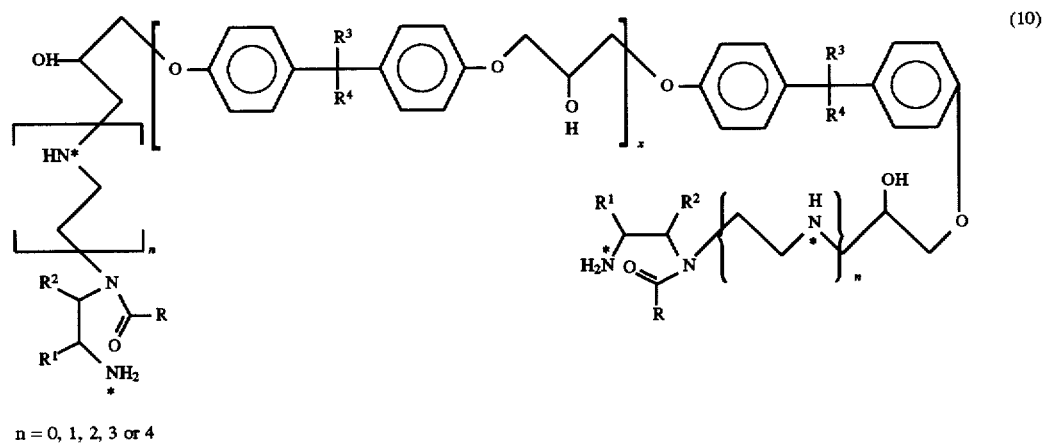
(10)
n = 0, 1, 2, 3 or 4
The structure of polymer (11) wherein x=0 or 1 is given below:

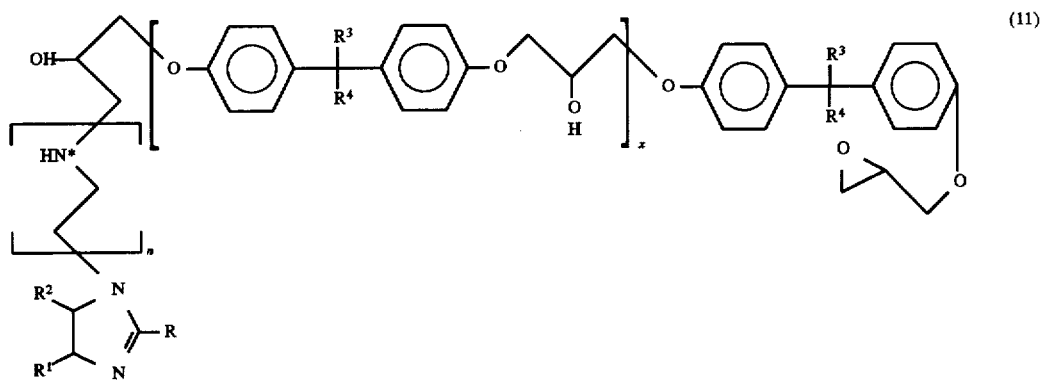

(11)

The structure of polymer (12) wherein x=0 or 1 is given below:

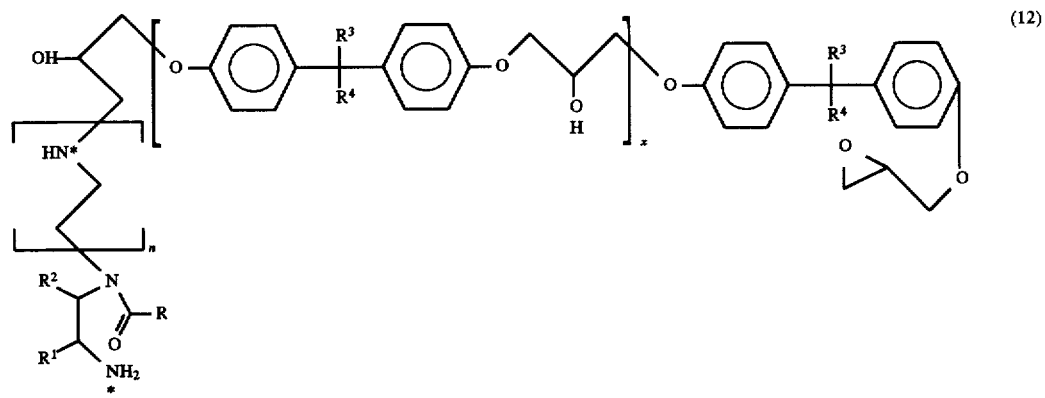

(12)

The structure of polymer (13) wherein x=0 or 1 is given below:

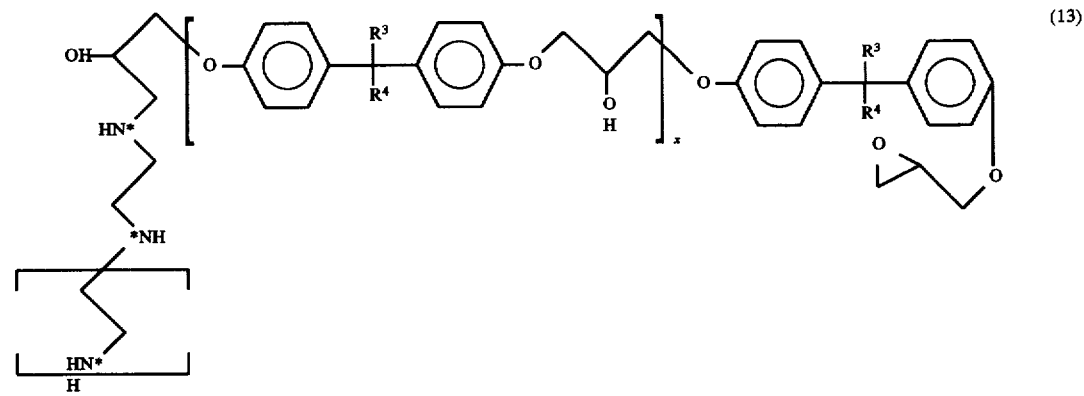

(13)

In polymer (5), polymer (6), polymer (7), polymer (8), polymer (9), polymer (10), polymer (11), polymer (12), and polymer (13), R, $R^1$, $R^2$, $R^3$, and $R^4$ are saturated hydrocarbons of 1 to 25 atoms. Note that reaction takes place between an amine nitrogen (or an amide nitrogen on compound (4) when n=0; or an imidazoline nitrogen on compound (2) when n=0; note that the value of n may be the same or different with respect to the structures of compounds (2) and (4), respectively) on exemplary compounds (2), (3) and (4) and a secondary carbon on an epoxy ring in the exemplary glycidyl ether (1), respectively. Each primary and/or secondary amine nitrogen atom marked with an asterisk (*) on the exemplary pipelining products (5)–(13), inclusive, can further react with the methylene carbon atom of an available epoxide ring originally from, for example, the diglycidyl ether of Bisphenol A (DGEBA) or the diglycidyl ether of Bisphenol F (DGEBF) wherein a new —C—N— bond is formed. The formation of at least one new —C—N— bond at one of the available primary and/or secondary amine nitrogens (i.e. marked with an asterisk) results in the formation of an analogous cross-linked network polymer. The cross-linked network polymer has one or more cross-linking —C—N— bonds and the cross-linked network polymer forms the pipelining network polymer which is the subject invention of this patent application. The reaction product of exemplary reactants (1), (2), (3) and (4) is an exemplary cross-linked network polymer of one or more of (5), (6), (7), (8), (9), (10), (11), (12), (13) and (others). Note that another exemplary network polymer may be formed by the reaction of exemplary reactants (1), (2), (3a) and (4)—{reaction not schematically shown}. Another exemplary network polymer may be formed by the reaction of exemplary reactants (1), (2), (3), (3a) and (4)—{reaction not schematically shown}. Yet another exemplary network polymer may be formed by the reaction of exemplary reactants (1), (2), (2a), (3), (3a), (4) and/or (4a)—{reaction not schematically shown}.

Other variations of the cross-linked network polymer can be drawn which are within the scope of the present inventive discovery. However, it is sufficient to describe these cross-linked network polymer variations to include cross-linking bonds between the primary and/or secondary nitrogen atoms of the curing agent blend (i.e. the curing agent blend comprising the amine curing agent, the amidoamine curing agent and the imidazoline curing agent) and the methylene carbon atoms from the epoxy resin on the epoxide ring. An exemplary cross-linked network polymer may be formed by a reaction between exemplary compounds (2), (3), (3a) and/or (4) and exemplary compound (1), for example, DGEBA and/or DGEBF (i.e. DGEBA: $R^3=R^4=CH_3$; DGEBF: $R^3=R^4=H$).

The previously described reaction of (1a) and (3a) to form (4) and/or (4a) followed by the loss of a water molecule from (4) and/or (4a) for each molecule of (2) and/or (2a) formed, respectively, is called cyclization. Sometimes, a relatively small amount of exemplary epoxide (1) (e.g. 0 to 12 mole %) is added to the exemplary curing agent blend of (2), (2a), (3a), (4) and/or (4a) to aid in the curing process when larger quantities of (1) are used to form the cross-linked pipelining network polymer; this is called adduction.

Typically, the curing agent blend comprising the amine curing agent, the imidazoline curing agent and the amidoamine curing agent has an amine gram equivalent weight (AEW) per active amine between about 90 to about 800 grams. More typically, the curing agent blend has an AEW per active amine between about 95 to about 400 grams. Most typically, the curing agent blend has an AEW per active amine between about 100 to about 200 grams. Preferably, the curing agent blend has an AEW per active amine between about 110 to about 180 grams. More preferably, the curing agent blend has an AEW per active amine between about 120 to about 170 grams. Most preferably, the curing agent blend has an AEW per active amine between about 130 to about 160 grams.

The curing agent blend must contain both polar and nonpolar moieties. These moieties provide surfactant properties to the pipelining formulation. The surfactant properties are necessary to ensure that the resulting lining will have the necessary tolerance for oils, dirt and other imperfections present on the pipe surface or other surface to be coated with the pipelining.

A solvent such as benzyl alcohol ($C_6H_5CH_2OH$) may be used as a reactive diluent. The exemplary benzyl alcohol reactive diluent is added to the curing agent blend. Upon the reaction of the curing agent blend with the epoxy resin to form the pipelining network polymer, the diluent is present in an amount to comprise 0 to 35 percent by weight of the final cured exemplary pipelining network polymer product (also referred to as pipelining) of one or more of (5)–(13), inclusive. The exemplary benzyl alcohol reactive diluent is used in order to dilute and/or adjust the viscosity of the homogeneous final mixture of epoxy resin and the curing agent blend. Benzyl alcohol is a valuable diluent because it reacts with glycidyl ether becoming covalently joined to the pipelining network polymer product. Therefore, the benzyl alcohol does not evaporate into the atmosphere as an objectionable volatile organic compound (VOC). Other additives such as nonylphenol may be added in small amounts less than about 5 percent by weight of the final cured pipelining network polymer product. Nonylphenol, like benzyl alcohol, is optionally added to the exemplary curing agent blend at a level of 0–5 percent by weight of the final cured exemplary pipelining network polymer product. The final cured pipelining network polymer product is recognized to be a mixture of isomers (e.g. an exemplary mixture of the network polymer of one or more of (5)–(13), inclusive, and may contain unreacted acids, for example, (1a) and amines, for example, (2), (3), (3a), (4) and (4a)).

The imidazoline component, for example (2), of the curing agent blend is more miscible with the exemplary diglycidyl ether (1) than is the exemplary uncyclized polyamide (4), another component of the exemplary curing agent blend. Before the cure is complete and prior to application of the pipelining, it is sometimes necessary to allow the curing reaction to begin in order to prevent separation of the exemplary epoxy resin (1) from the curing agent blend. As a result, it is sometimes necessary to allow the reaction product (e.g. the network polymer of one or more of (5)–(13), inclusive) to begin to form (i.e. induct) before applying the mixture of the curing agent blend and the epoxy resin to the surface (e.g. any metallic or non-metallic surface) to be coated. This is referred to as the induction time. Typically, the induction time is between about 0 to 50 minutes. More typically, the induction time is between about 1 to 45 minutes. Most typically, the induction time is between about 2 to 30 minutes. Preferably, the induction time is between about 3 to 20 minutes. More preferably, the induction time is between about 4 to 15 minutes. Most preferably, the induction is between about 5 to 10 minutes. After induction, one can apply the reaction mixture (i.e. reaction mixture of the curing agent blend and the epoxy resin) at any time before the pot life of the reaction mixture is exceeded.

The optimal pot life is about 1 hour because this is about the amount of time needed to apply the formed pipelining on the interior of pipes. A pot life of much greater than about 2.25 hours, for example 4–5 hours, creates the problem of the lining being pulled down by gravity after application. A long pot life results in a thick coating being deposited at the bottom of the pipe and a relatively thin coating being deposited at the top and sides of the pipe.

A pot life of less than about 1 hour results in the hardening of the pipelining while the pipelining is being applied to the interior surface of a pipe. Therefore, a pot life of less than about 1 hour creates problems in the application of the pipelining. However, depending upon the method of application of the pipelining, a pot life sufficiently long to allow complete application and sufficiently short to allow drying (hardening) to prevent excessive running (due to gravity) is sought.

Typically, a suitable pot life is between about 1.0–4.0 hours. More typically, a suitable pot life is between about 1.0–3.5 hours. Most typically, a suitable pot life is between about 1.0–3.0 hours. Preferably, a suitable pot life is between about 1.0–2.75 hours. More preferably, a suitable pot life is between about 1.0–2.50 hours. Most preferably, a suitable pot life is between about 1.0–2.25 hours.

In addition to the desired pot life, the curing agent blend is chosen to have other specific properties. The mixed viscosity (viscosity of the homogeneous mixture of curing agent blend and epoxy resin prior to cure), typically, should be between about 350–1000 centipoise. The mixed viscosity, more typically, should be between about 375–900 centipoise (cps). Most typically, the mixed viscosity of the lining should be between about 400–800 cps. Preferably, the mixed viscosity of the lining should be between about 415–750 cps. More preferably, the mixed viscosity of the lining should be between about 425–725 cps. Most preferably, the mixed viscosity of the lining should be between about 440–700 cps.

As stated earlier, NRL formula 4A had been used for lining pipes in aircraft carriers since 1988. The epoxy resin used in NRL formula 4A was DGEBA (3a) and the curing agent was oligomeric methylene dianiline (MDA) having the formula:

n = 1, 2, 3, 4, 5, or 6 and also containing benzyl alcohol.

NRL formula 4A was prepared according to the following method. Typically, NRL formula 4A is manufactured in two separate parts, part A comprising a pigmented epoxy resin and part B comprising a curing agent. Parts A and B are not combined until just before the pipelining is to be applied. For example, part A of pipelining 4A was manufactured by mixing all of the liquid epoxy resin (3a), all of an optional pigment such as iron oxide and all of an optional viscosity controlling agent such as fumed silica in a high speed disperser or a 3-roll mill until the mixture (part A) was uniformly mixed and the optional pigments were ground to a fineness of at least 4 on the Hegman Scale, as measured by the ASTM standard test method D1210–79, Fineness of Dispersion of Pigmented-Vehicle Systems. Part B consisted only of the curing agent (i.e. MDA) which was used as received.

The 4A pipelining was made by thoroughly stirring parts A and B separately until each was homogeneous. Thereafter, the two parts A and B were combined and blended until the mixture was homogeneous. The mixture remained fluid for about one hour after blending. The mixture must be applied while it remained fluid. After about one hour, the mixture became extremely viscous and could not be applied in the non-fluid state. Complete cure was achieved after several days at 50° F. or above.

MDA is available from Ciba-Geigy under the designation Ciba-Geigy HY2969®. When it became clear that MDA, its amine derivatives, or its aromatic derivatives were no longer a viable part B curing agent, an alternative curing agent was sought wherein the resulting pipelining had properties similar to those of NRL formula 4A.

Exemplary suitable epoxy resins may have the following structures:

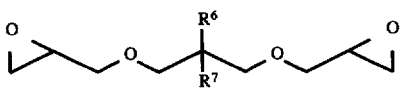

$R^1 = R^7 = CH_2CH_3$ (3,3-dimethylolpentane diglycidyl ether)

$R^6 = R^7 = CH_3$ (Neopentyl diol diglycidyl ether)

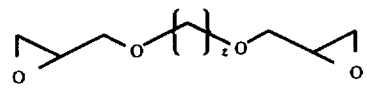

z = 4 (butanedioldiglycidyl ether)

z = 5 (pentanedioldiglycidyl ether)

z = 6 (hexanedioldiglycidyl ether)

z = 7 (heptanedioldiglycidyl ether)

z = 8 (octanedioldiglycidyl ether)

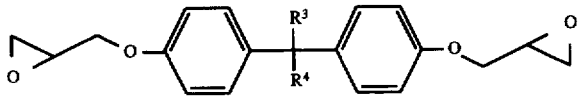

$R^3 = R^4 = CH_3$ (DGEBA)

$R^3 = R^4 = H$ (DGEBF)

$R^3 = H; R^4 = CH_3$ (DGEBE)

$R^3 = CH_3; R^4 = H$ (DGEBE)

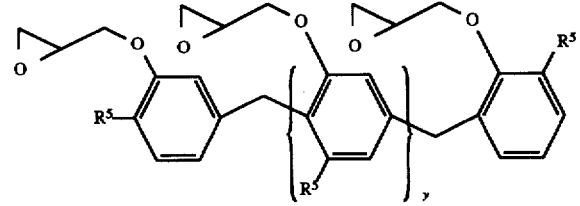

$R^5 = CH_3$ or H or mixture thereof $R^5 = CH_3$ (Cresol Novolac)

$R^5 = H$ (Phenol Novolac)

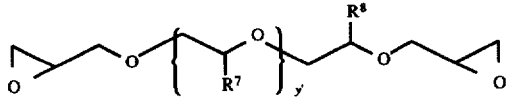

$R^7 = CH_3$, or $CH_2CH_3$, or $CH_2CH_2CH_3$ $R^8 = CH_3$, or $CH_2CH_3$, or $CH_2CH_2CH_3$ y' = 0, 1, 2, 3, 4, 5, 6, 7, or 8

Exemplary epoxy resins are the diglycidyl ethers derived from phenol such as DGEBA and DGEBF among others. A variety of epoxy resins that satisfy the above requirements are commercially and include products such as Epon 828™ available from Shell.

Typically, the suitable epoxy resin has an equivalent weight per epoxide unit of between about 150 to 950 grams. More typically, the suitable epoxy resin has an equivalent weight per epoxide unit of between about 155 to 900 grams. Most typically, the suitable epoxy resin has an equivalent weight per epoxide unit of between about 160 to 800 grams. Preferably, the suitable epoxy resin has an equivalent weight per epoxide unit of between about 165 to 700 grams. More preferably, the suitable epoxy resin has an equivalent weight per epoxide unit of between about 170 to 600 grams. Even more preferably, the suitable epoxy resin has an equivalent weight per epoxide unit of between about 175 to 500 grams. Most preferably, the suitable epoxy resin has an equivalent weight per epoxide unit of between about 180 to 195 grams.

The optional pigment may be used to give color to the pipelining network polymer formed by the reaction between the curing agent blend and an epoxy resin. An iron oxide pigment is a synthetic red iron oxide pigment containing a minimum of 93 percent of ferric oxide and conforming to American Society for Testing and Materials (ASTM) standard specification D3721-83. The color imparted by the iron oxide pigment is preferably sufficiently opaque so that a 75 micrometer thick film containing 4.0 percent or more of the pigment completely hides the surface being covered. The pigment is insoluble in water, non-fading and chemically stable.

Typically, the oil absorption of the iron oxide pigment is between about 10 to 60 pounds of oil per hundred pounds of pigment. More typically, the oil absorption of the pigment is between about 11 to 50 pounds of oil per hundred pounds of pigment. Most typically, the oil absorption of the pigment is between about 12 to 40 pounds of oil per hundred pounds of pigment. Preferably, the oil absorption of the pigment is between about 13 to 30 pounds of oil per hundred pounds of pigment. More preferably, the oil absorption of the pigment is between about 14 to 25 pounds of oil per hundred pounds of pigment. Most preferably, the oil absorption of the pigment is between about 16 to 20 pounds of oil per hundred pounds of pigment.

Typically, the density of the iron oxide pigment is between about 34 to 47 pounds per gallon. More typically, the density of the iron oxide pigment is between about 36 to 45 pounds per gallon. Most typically, the density of the iron oxide pigment is between about 38 to 43 pounds per gallon. Preferably, the density of the iron oxide pigment is between about 39 to 42 pounds per gallon. More preferably, the density of the iron oxide pigment is between about 40 to 41.5 pounds per gallon. Most preferably, the density of the iron oxide pigment is between about 40.6 to 41.0 pounds per gallon.

Suitable exemplary red iron oxide pigments include the following: Red Iron Oxide RO-6097™ from Pfizer, Inc.

If a titanium dioxide pigment is chosen, the pigment is rutile titanium dioxide pigment containing a minimum of 80 percent of titanium dioxide and conforming to Type IV of the ASTM standard specification D476-84. The titanium dioxide pigment is bright white in color and is sufficiently opaque so that a 75 micrometer thick film containing 4.0 percent or more of the pigment completely hides the surface being covered. The pigment is insoluble in water, non-fading and chemically stable.

Typically, the oil absorption of the titanium dioxide pigment is between about 14 to 45 pounds of oil per hundred pounds of pigment. More typically, the oil absorption of the pigment is between about 14.2 to 40 pounds of oil per hundred pounds of pigment. Most typically, the oil absorption of the pigment is between about 14.4 to 30 pounds of oil per hundred pounds of pigment. Preferably, the oil absorption of the pigment is between about 14.6 to 20 pounds of oil per hundred pounds of pigment. More preferably, the oil absorption of the pigment is between about 15 to 19 pounds of oil per hundred pounds of pigment. Most preferably, the oil absorption of the pigment is between about 16 to 18 pounds of oil per hundred pounds of pigment.

Typically, the density of the titanium dioxide pigment is between about 24 to 41 pounds per gallon. More typically, the density of the titanium dioxide pigment is between about 26 to 39 pounds per gallon. Most typically, the density of the titanium dioxide pigment is between about 28 to 37 pounds per gallon. Preferably, the density of the titanium dioxide pigment is between about 30 to 35 pounds per gallon. More preferably, the density of the titanium dioxide pigment is between about 31 to 34 pounds per gallon. Most preferably, the density of the titanium dioxide pigment is between about 31.5 to 33.5 pounds per gallon.

Suitable exemplary titanium dioxide pigments include the following: $TiO_2$ R-960 TiPure™ available from E.I. Dupont Nemours, Inc.

Other suitable exemplary pigments may be selected from the group consisting of phthalocyanine blue and phthalocyanine green and mixtures thereof. The pigments suitable for use with the present invention are the non-toxic pigments (i.e. do not leach out metals such as lead or other toxic materials). A number or other visible color pigments may be used, for example, the white pigments (e.g. Titanium Dioxide-Rutile, Titanium Dioxide-Anatase), extender pigments (e.g. Calcium Carbonate, Silica, Other Silicas, Talc, China Clay, Clay, Mica), Iron Oxide Pigments (e.g. Yellow Iron Oxide, Brown Iron Oxide, Black Iron Oxide), Red Pigments (e.g. Quinacridone), Yellow and Orange Pigments (e.g. Hansa Yellow, Diarylide Orange Toner), Green Pigments (e.g. Phthalocyanine Green), Blue Pigments (e.g. Phthalocyanine Blue, Ultramarine Blue), Black Pigments (e.g. Carbon Black, Lampblack), and other pigments (e.g. Aluminium Powders, Stainless Steel Powder) to name a few. Other pigments listed in National Paint and Coatings Association Raw Materials Index complying with the above stated properties are suitable for use with the present invention and are incorporated herein by reference in their entirety for all purposes.

The viscosity controlling agents (i.e. the thixotropic agents) are selected to have specific properties. The thixotropic agent is a hydrophobic fumed silica containing a minimum of 98 percent of silicon dioxide. The thixotropic agent is insoluble in water and chemically stable. Typically, the thixotropic agent has a Brunauer, Emmett & Teller (BET) ASTM C-819 surface area of between about 80 to 300 square meters per gram. More typically, the thixotropic agent has a (BET) ASTM C-819 surface area of between about 82 to 200 square meters per gram. Most typically, the thixotropic agent has a (BET) ASTM C-819 surface area of between about 84 to 150 square meters per gram. Preferably, the thixotropic agent has a (BET) ASTM C-819 surface area of between about 86 to 125 square meters per gram. More preferably, the thixotropic agent has a (BET) ASTM C-819 surface area of between about 88 to 120 square meters per gram. Most preferably, the thixotropic agent has a (BET) ASTM C-819 surface area of between about 90 to 110 square meters per gram.

Typically, the density of the thixotropic agent is between about 10 to 20 pounds per gallon. More typically, the density of the thixotropic agent is between about 11 to 19 pounds per gallon. Most typically, the density of the thixotropic agent is between about 12 to 18 pounds per gallon. Preferably, the density of the thixotropic agent is between about 13 to 17 pounds per gallon. More preferably, the density of the thixotropic agent is between about 13.5 to 16.5 pounds per gallon. Most preferably, the density of the thixotropic agent is between about 15 to 16 pounds per gallon.

Suitable exemplary thixotropic agents may be selected from the group consisting of Cab-O-Sil TS-720™, Cab-O-Sil R 974™, each available from Cabot Corp., hydrophobic fumed silica and mixtures thereof. Other suitable thixotropic agents listed in National Paint and Coatings Association Raw Materials Index complying with the above stated properties are suitable for use with the present invention and are incorporated herein by reference in their entirety for all purposes.

EXAMPLE 1

Add epoxy resin (e.g. Epon 828 from Shell Chemical Company, 500 gm) to a 1000 mL steel beaker equipped with a high speed paint agitator (Cowles type mixing blade). While stirring the epoxy resin at about 2000 revolutions per minute, slowly add 77.5 grams of red iron oxide pigment (e.g. $Fe_2O_3$; R-6097 from Pfizer Inc. is a suitable iron oxide pigment) over a period of 2–3 minutes. Immediately thereafter, add 0.52 grams of fumed silica (e.g. Cab-O-Sil TS-720 from Cabot Corp.) to the agitating mixture of epoxy resin and iron oxide. Next, raise the agitator speed to 4000 revolutions per minute and continue mixing until complete dispersion of the iron oxide pigment and the fumed silica is achieved over a period of about 5–6 minutes. Note that complete dispersion can be determined by the Hegman grind standard of at least 4. Thereafter, strain the complete dispersion through a coarse filter with a sieve number of 60. This mixture of epoxy resin, iron oxide pigment and fumed silica is the component A mixture.

Component A is now ready to be mixed with the curing agent blend which curing agent blend is component B. To 578 grams of Component A containing 500 gm of Epon 828 (500 gm/190 gm EEW=2.63 gram equivalents) add 2.63 gram equivalents ±10% (e.g. 2.63× AEW) of component B. Then agitate the mixture of Component A and Component B for about 5 minutes to achieve a homogeneous mix. Let the homogeneous mixture of Component A and Component B stand for 5–10 minutes. An exemplary Cu—Ni alloy pipe having a length of about 20 to 30 feet and an inner diameter of 2 inches may be coated with the homogeneous mixture of Components A and B. Pre-treat by sand blasting the inner surface of the exemplary Cu—Ni alloy pipe to be coated with garnet grit (20–30 mesh; Idaho garnet sand is preferred) sand followed by drying with dry air.

All mixing is to be done at standard temperature and pressure of about 1 atmosphere and 25 degrees Celsius. After achieving complete mixing and allowing the mixture (of Components A and B) to stand for 5–10 minutes, apply the homogeneous mixture of Component A and Component B to the inner surface of a Cu—Ni alloy pipe using an air stream to cause the homogeneous mixture of Component A and Component B to coat the inner surface of the pipe.

Allow the applied coating to dry for about 1 to 2 hours at room temperature and pressure. Apply a second coat in the same manner as described during the first coating process. A total coating thickness of about 12 mils at the top and of about 20 mils at the bottom inner surfaces should be achieved.

After about 24 hours of drying time at room temperature and pressure, a fully intact cured inner coating of the Cu—Ni alloy piping is obtained wherein all the inner surfaces were fully coated with an intact layer of the cured pipelining.

EXAMPLE 2

An exemplary curing agent blend was prepared by reacting palmitic acid, 1,2-DCH, DGEBA and benzyl alcohol. The exemplary curing agent blend was prepared as follows:

(a) Palmitic acid (solid; 24.7 gm.; 0.0963 moles; $C_{16}H_{32}O_2$) was placed in an Erlenmeyer flask containing a magnetic stirrer and connected to a condenser with a Dean-Stark trap.

(b) 1,2-diaminocyclohexane (liquid; 11.8 gm.; 0.1033 moles; $C_6H_{14}N_2$) was placed in the flask from step (a) and the reaction mixture was heated to 170° C. over 10–20 minutes on a hot plate. As the palmitic acid melted into a liquid, the reaction mixture was stirred using a Teflon-coated magnetic stirrer. Stirring and continuous heating at 170° C. was carried out for 4 hours while about 1.8 grams of water (about 0.0999 moles $H_2O$) was collected by the Dean-Stark trap.

(c) The reaction mixture from step (b) was allowed to cool to 100° C. by reducing the temperature of the hot plate. Cooling to 100° C. was achieved in about 10–15 minutes. After cooling, additional 1,2-diaminocyclohexane (liquid; 30 gm.; 0.2627 moles; $C_6H_{14}N_2$) was added to the reaction flask under constant stirring. Additionally, DGEBA (liquid; 22.3 gm.; x=0; 0.0655 moles; $C_{21}H_{24}O_4$; see infra page 38) was added to the reaction flask under constant stirring. The reaction mixture was stirred for 1 hour at a temperature between about 60°–80° C. Thereafter, benzyl alcohol (liquid; 9.4 gm; 0.0869 moles; $C_7H_8O$) was added to the reaction mixture under continuous stirring. Then more 1,2 diaminocyclohexane (liquid; 30 gm.; 0.2627 moles; $C_6H_{14}N_2$) was added dropwise over 10–15 minutes to the reaction mixture followed by the dropwise addition of benzyl alcohol (liquid; 15.8 gm.; 0.1461 moles; $C_7H_8O$) over another 10–15 minutes at 60°–100° C. under continuous stirring.

(d) Thereafter, the reaction mixture was poured into a beaker and allowed to cool to room temperature over 60–80 minutes.

(e) To 15.9 grams of the mixture of step (d), 1,2 diaminocyclohexane (liquid; 1.6 grams; 0.0140 moles; $C_6H_{14}N_2$) was added and mixed until a new homogeneous mixture was obtained. This final mixture formed the desired exemplary curing agent blend referred to as Component B.

(f) To 100 grams of Component A prepared according to Example 1, supra, 15.7 grams of Component B (step (e) of example 2) was added. The mixture of Component A (100 grams) and Component B (15.7 grams) was stirred until homogeneous. Thereafter, the mixture was allowed to induct for 10–15 minutes. Immediately thereafter, the inducted homogeneous mixture was applied to a steel plate using a paint brush to a thickness of about 10 to 15 mils. The film was allowed to dry for about 2.75 hours, at which time it was dry to touch. The pot life of the mixture was between about 1.5 to about 1.8 hours, inclusive. After 7 days of drying, the film passed the 40 inch-pound direct impact ASTM D-2794 test. The film showed chemical resistance to hot aqueous sodium hypochlorite and/or calcium hypochlorite (e.g. Chlorox™) at 60° C. for 7 days and to 7% by weight of hot sulfuric acid (e.g. at 60° C.) for 7 days. The reaction steps of EXAMPLE 2 are depicted below:

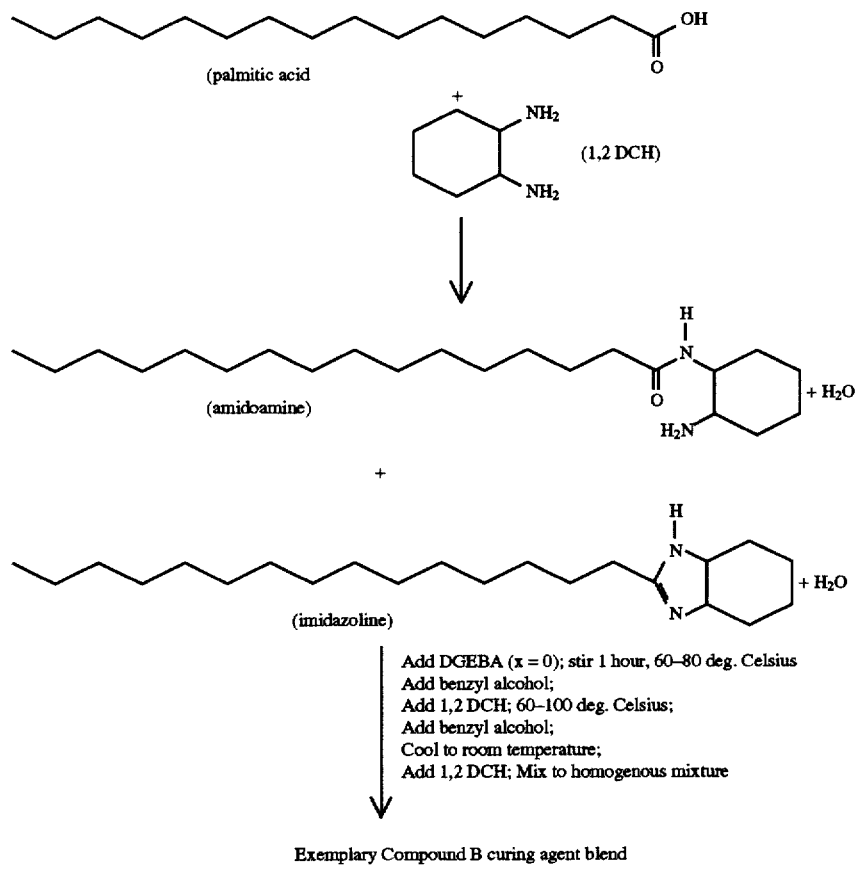

Exemplary Compound B curing agent blend

EXAMPLE 3

An exemplary curing agent blend was prepared by reacting azelaic acid (nonanedioic acid), hexanoic acid, triethylene tetramine ($NH_2CH_2CH_2NHCH_2CH_2NHCH_2CH_2NH_2$; TETA) and benzyl alcohol. The exemplary curing agent blend was prepared as follows:

(a) Azelaic acid (solid; 90.9 gm.; 0.483 moles; $C_9H_{16}O_4$) was placed in a 3-neck round bottom flask containing a magnetic stirrer, nitrogen inlet and a thermometer, the flask connected to a condenser with a Dean-Stark trap.

(b) TETA (liquid; 146.25 gm.; 1.00 moles; $C_6H_{18}N_4$) was placed in the flask from step (a) and the reaction mixture was heated to 230° C. over 10–20 minutes in a silicone oil bath. As the azelaic acid melted into a liquid, the reaction mixture was stirred using a Teflon-coated magnetic stirrer. Stirring and continuous heating at 230° C. was carried out for about 4.5 hours while about 24 grams of water (about 1.33 moles $H_2O$) was collected by the Dean-Stark trap.

(c) The reaction mixture from step (b) was allowed to cool to room temperature by reducing the temperature of the silicone oil bath. Cooling was achieved in about 60 minutes. After cooling, hexanoic acid (liquid; 50.2 gm.; 0.433 moles; $C_6H_{12}O_2$) was added to the reaction flask under constant stirring. The reaction mixture was heated for about 2.25 hour at a temperature between about 230°–240° C. wherein about 3.5 grams of water (0.194 moles of $H_2O$) was removed. The mixture was cooled to 100° C. and benzyl alcohol (liquid; 17.2 gm; 0.15 moles; $C_7H_8O$) was added to the reaction mixture under continuous stirring.

(d) Thereafter, the reaction mixture was poured into a beaker and allowed to cool to room temperature over 60–80 minutes. This final mixture formed the desired exemplary curing agent blend referred to as Component B.

(e) To 25 grams of Component A (Component A prepared according to Example 1, supra) containing 21.63 gm of Epon 828 (21.63 gm/190 gm EEW=0.114 gram equivalents) 0.114 gram equivalents ±10% (e.g. 0.114× AEW; about 17 grams) of component B was added. The mixture of Component A and Component B was agitated for about 5 minutes to achieve a homogeneous mix. The homogeneous mixture of Component A and Component B was allowed to stand for 5–10 minutes. An exemplary sandblasted flat steel panel (6" by 6")was coated with the homogeneous mixture of Components A and B. All mixing was done at standard temperature and pressure of about 1 atmosphere and 25° C. The applied coating was dried for about 1 to 2 hours at room temperature and pressure. A total coating thickness of about 12 mils was obtained on the coated surface of the steel panel. After about 24 hours of drying time at room temperature and pressure, a fully intact cured coating was obtained on the steel panel. The coated steel panel passed the 40 inch-pound ASTM D- 2794 test. The film exhibited chemical resistance to hot aqueous sodium hypochlorite and/or calcium hypochlorite (e.g. Chlorox™) at 60° C. for 7 days and to 7% by weight hot sulfuric acid (i.e. at 60° C.) for 7 days.

The reaction steps of EXAMPLE 3 are depicted below:

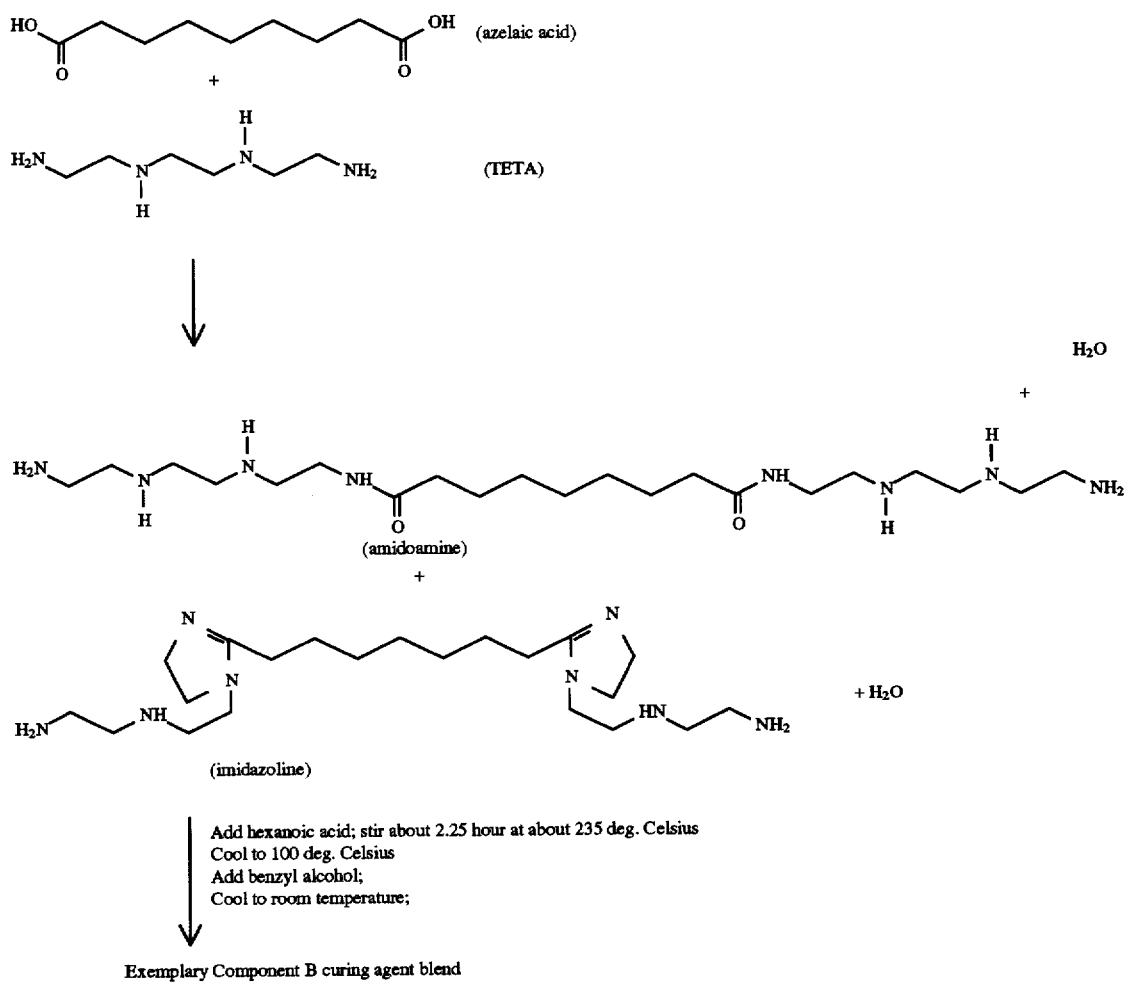

Exemplary Component B curing agent blend

What is claimed is:

1. A cross-linked network polymeric coating on the interior surface of a pipe for carrying potable water, said polymeric coating being produced by in-situ cross-linking polymerization of a polymerizable composition, said polymerizable composition comprising:

(a) at least one liquid epoxy resin having at least two glycidyl ether groups; and (b) a liquid curing agent blend comprising:

(i) an aliphatic polyamine in an amount of about 1–70 mole % based on the liquid curing agent blend;

(ii) an aliphatic imidazoline derived from fatty acids, said aliphatic imidazoline having a polar moiety and a nonpolar moiety and being present in an amount of about 0.1–40 mole % based on the liquid curing agent blend; and (iii) an aliphatic amidoamine in an amount of about 5–95 mole % based on the liquid curing agent blend;

in an amount effective to cure said polymerizable composition to said cross-linked network polymeric coating;

said cross-linked network polymeric coating having been applied by a turbulent moving steam of air or other gas, or propellant system, said polymerizable composition onto an inner surface of said pipe, thereby causing said polymerizable composition to flow out and wet said inner surface of said pipe and form an uncured pipelining; and polymerizing said uncured pipelining in situ to form said cross-linked network polymer lining on said inner surface of said pipe, thus forming a lined pipe;

wherein said polymerizable composition has a pot life of about 1–4 hours, wherein said polymerizable composition further comprises a sufficient amount of a hydrophobic fumed silica thixotropic agent to provide said polymerizable composition with an as-applied mixed viscosity of about 350 to about 1000 centipoise;

wherein said cross-linked polymeric coating comprises a cross-linked polymer selected from the group consisting of:

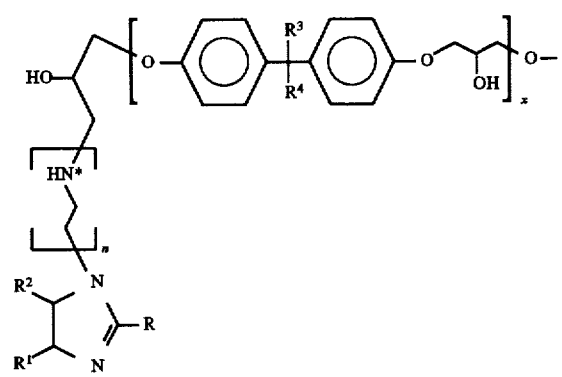
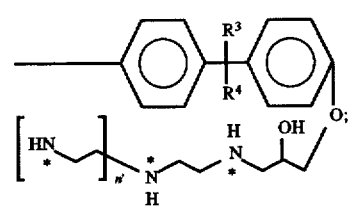
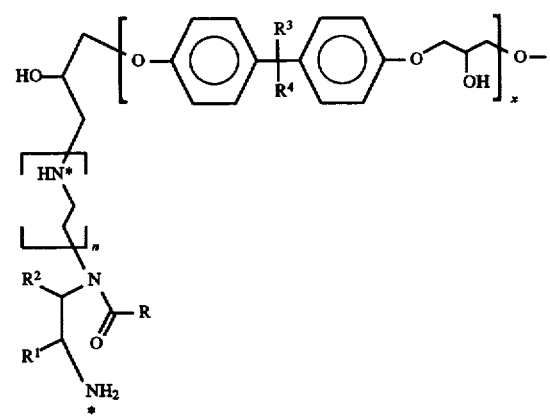
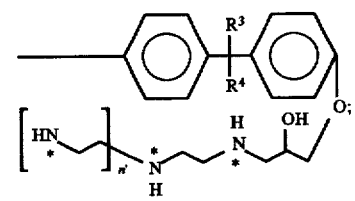
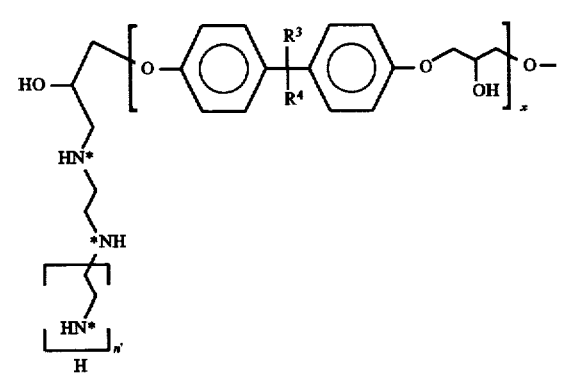
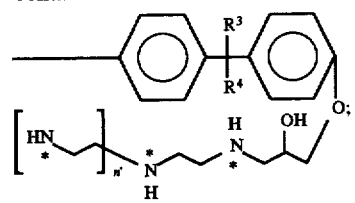
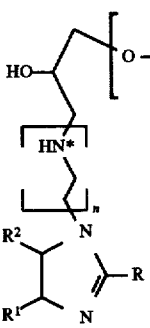
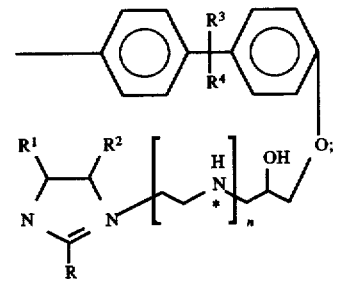
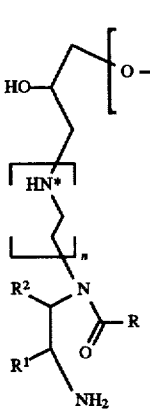

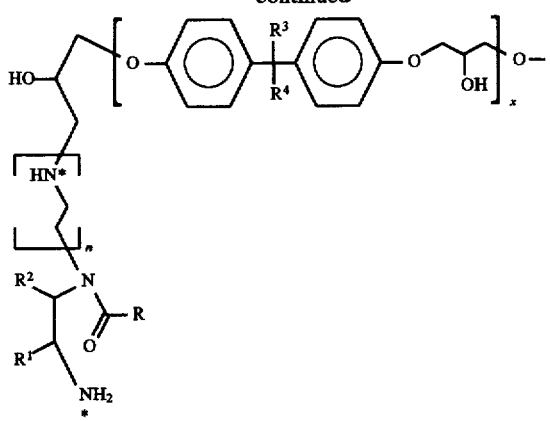

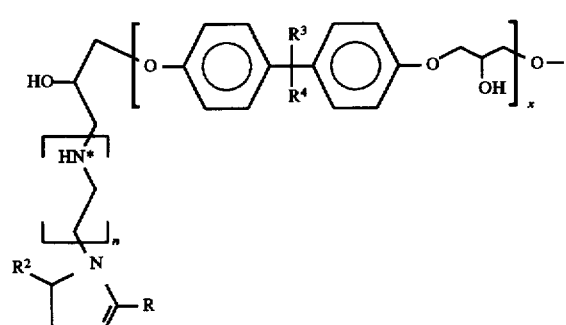

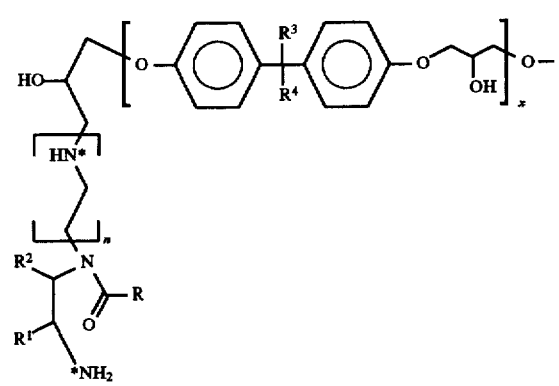

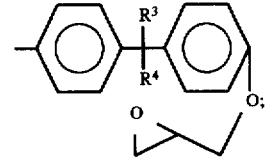

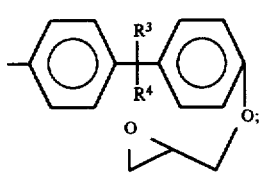

and mixtures thereof wherein n is an integer selected from the group consisting of 0, 1, 2, 3, 4 or mixtures thereof, wherein n' is an integer selected from the group consisting of 0, 1, 2, 3, or mixtures thereof, wherein x is an integer having a value of 0, 1 or mixtures thereof and wherein R $R^1$, $R^2$, $R^3$, and $R^4$ are saturated hydrocarbons of 1 to 25 carbon atoms and wherein said asterisk indicates primary and secondary amine nitrogens and wherein at least one of said primary and said secondary amine nitrogens marked with said asterisk are crosslinked to an available methylene carbon atom of an available oxirane ring.

2. The cross-linked network polymeric coating of claim 1, wherein said polymeric composition has a pot life of about 1–4 hour and further comprises a sufficient amount of a hydrophobic fumed silica thixotropic agent to provide said polymerizable composition with an as-applied mixed viscosity of about 350 to about 1000 centipoise.

3. The cross-linked network polymer of claim 1 wherein said polymerizable composition has a pot life of about 1–3.5 hours and further comprises a sufficient amount of a hydrophobic fumed silica thixotropic agent to provide said polymerizable composition with an as-applied mixed viscosity of about 375–900.

4. The cross-linked network polymer of claim 1 wherein said polymerizable composition has a pot life of about 1.0–3.0 hours and further comprises a sufficient amount of a hydrophobic fumed silica thixotropic agent to provide said polymerizable composition with an as-applied mixed viscosity of about 400–800 centipoise.

5. The cross-linked network polymer of claim 1 wherein said polymerizable composition has a pot life of about 1.0–2.75 hours and further comprises a sufficient amount of a hydrophobic fumed silica thixotropic agent to provide said polymerizable composition with an as-applied mixed viscosity of about 415–750 centipoise.

6. The cross-linked network polymer of claim 1 wherein said polymerizable composition has a pot life of about 1.0–2.25 hours and further comprises a sufficient amount of a hydrophobic fumed silica thixotropic agent to provide said polymerizable composition with an as-applied mixed viscosity of about 425–725 centipoise.

7. The cross-linked network polymer of claim 1 wherein said polymerizable composition has a pot life of about 1.0–2.25 hours and further comprises a sufficient amount of a hydrophobic fumed silica thixotropic agent to provide said polymerizable composition with an as-applied mixed viscosity of about 440–700 centipoise.

8. The cross-linked network polymer of claim 1 wherein said curing agent blend comprises:
 (i) said aliphatic polyamine in an amount of about 2–69 mole % based on said blend;
 (ii) said aliphatic imidazoline in amount of about 0.5–35 mole % based on said blend; and
 (iii) said aliphatic amidoamine in an amount of about 6–90 mole % based on said blend.

9. The cross-linked network polymer of claim 1 wherein said curing agent blend comprises:
 (i) said aliphatic polyamine in an amount of about 3–68 mole % based on said blend;
 (ii) said aliphatic imidazoline in amount of about 0.75–30 mole % based on said blend; and
 (iii) said aliphatic amidoamine in an amount of about 7–85 mole % based on said blend.

10. The cross-linked network polymer of claim 1 wherein said curing agent blend comprises:
 (i) said aliphatic polyamine in an amount of about 4–67 mole % based on said blend;
 (ii) said aliphatic imidazoline in amount of about 0.8–25 mole based on said blend; and
 (iii) said aliphatic amidoamine in an amount of about 8–84 mole % based on said blend.

11. The cross-linked network polymer of claim 1 wherein said curing agent blend comprises:
 (i) said aliphatic polyamine in an amount of about 5–66 mole % based on said blend;
 (ii) said aliphatic imidazoline in amount of about 0.9–22 mole % based on said blend; and
 (iii) said aliphatic amidoamine in an amount of about 9–83 mole % based on said blend.

12. The cross-linked network polymer of claim 1 wherein said curing agent blend comprises:
 (i) said aliphatic polyamine in an amount of about 6–65 mole % based on said blend;
 (ii) said aliphatic imidazoline in amount of about 1.0–20 mole % based on said blend; and
 (iii) said aliphatic amidoamine in an amount of about 10–80 mole % based on said blend.

13. The cross-linked network polymer of claim 1 wherein said curing agent blend comprises a diluent in an amount of 0–10 mole % based on said blend.

14. The cross-linked network polymer of claim 1 wherein said curing agent blend comprises a diluent in an amount of 0–5 mole % based on said blend.

15. The cross-linked network polymer of claim 1 wherein said curing agent blend comprises:
 (i) said aliphatic polyamine in an amount of about 1–70 mole % based on said blend;
 (ii) said aliphatic imidazoline in amount of about 0.1–40 mole % based on said blend;
 (iii) said aliphatic amidoamine in an amount of about 5–95 mole % based on said blend;
 (iv) a diluent in an amount of about 0–40 mole % based on said blend; and
 (v) said epoxy resin in an amount of 0–10 mole % based on said blend.

16. The cross-linked network polymer of claim 1 wherein said curing agent blend comprises:
 (i) said aliphatic polyamine in an amount of about 2–69 mole % based on said blend;
 (ii) said aliphatic imidazoline in amount of about 0.5–35 mole % based on said blend;
 (iii) said aliphatic amidoamine in an amount of about 6–90 mole % based on said blend;
 (iv) a diluent in an amount of about 2–30 mole % based on said blend; and
 (v) said epoxy resin in an amount of 0–9 mole % based on said blend.

17. The cross-linked network polymer of claim 1 wherein said curing agent blend comprises:
 (i) said aliphatic polyamine in an amount of about 3–68 mole % based on said blend;
 (ii) said aliphatic imidazoline in amount of about 0.75–30 mole % based on said blend;
 (iii) said aliphatic amidoamine in an amount of about 7–85 mole % based on said blend;
 (iv) a diluent in an amount of about 3–25 mole % based on said blend; and
 (v) said epoxy resin in an amount of 0–8 mole % based on said blend.

18. The cross-linked network polymer of claim 1 wherein said curing agent blend comprises:
 (i) said aliphatic polyamine in an amount of about 4–67 mole % based on said blend;
 (ii) said aliphatic imidazoline in amount of about 0.8–25 mole % based on said blend;
 (iii) said aliphatic amidoamine in an amount of about 8–84 mole % based on said blend;
 (iv) a diluent in an amount of about 4–24 mole % based on said blend; and
 (v) said epoxy resin in an amount of 0–7 mole % based on said blend.

19. The cross-linked network polymer of claim 1 wherein said curing agent blend comprises:
 (i) said aliphatic polyamine in an amount of about 5–66 mole % based on said blend;
 (ii) said aliphatic imidazoline in amount of about 0.9–22 mole % based on said blend;
 (iii) said aliphatic amidoamine in an amount of about 9–83 mole % based on said blend;
 (iv) a diluent in an amount of about 5–23 mole % based on said blend; and
 (v) said epoxy resin in an amount of 0–6 mole % based on said blend.

20. The cross-linked network polymer of claim 1 wherein said curing agent blend comprises:
 (i) said aliphatic polyamine in an amount of about 6–65 mole % based on said blend;
 (ii) said aliphatic imidazoline in amount of about 1–20 mole % based on said blend;
 (iii) said aliphatic amidoamine in an amount of about 10–80 mole % based on said blend;
 (iv) a diluent in an amount of about 6–20 mole % based on said blend; and
 (v) said epoxy resin in an amount of 0–5 mole % based on said blend.

21. The cross-linked network polymer of claim 1 wherein said amidoamine is:

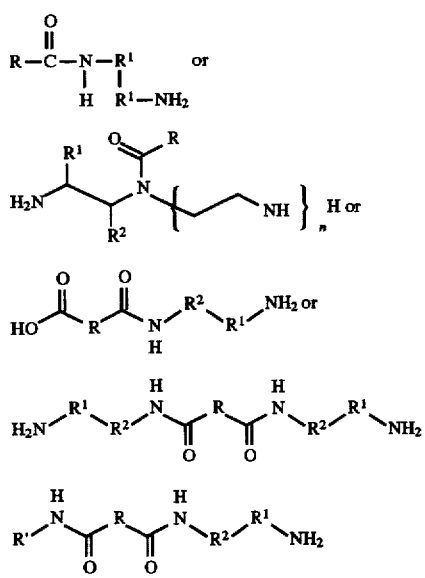

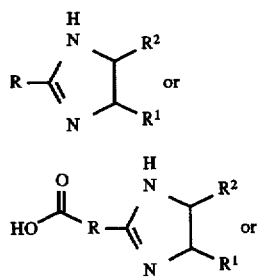

or mixtures thereof wherein R, R', R¹, and R² are selected from the group consisting of saturated hydrocarbons of 1 to 25 carbon atoms, saturated alkylamino compounds of 2 to 25 carbon atoms and mixtures thereof and n is an integer having a value of 0, 1, 2, 3, or 4.

22. The cross-linked network polymer of claim 1, wherein said alkylamino compounds are further selected from the group consisting of ethylene diamine, diethylene triamine, triethylene tetramine, tetraethylene pentamine, tris-(2-aminoethyl)amine, aminoethylpiperazine, and mixtures thereof.

23. The cross-linked network polymer of claim 1, wherein said imidazoline is:

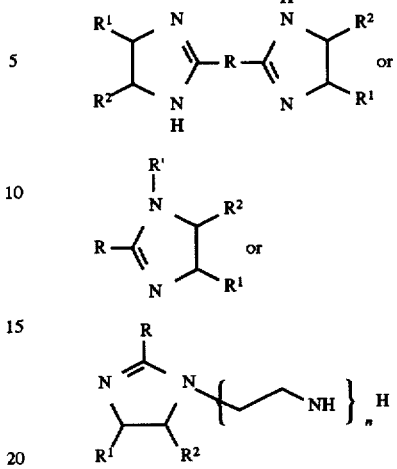

or mixtures thereof wherein R, R', R¹, and R² are selected from the group consisting of H, saturated hydrocarbons of 1 to 25 carbon atoms, saturated alkylamino compounds of 2 to 25 carbon atoms and mixtures thereof and n is an integer having a value of 0, 1, 2, 3, or 4.

24. The cross-linked polymer of claim 14, wherein said diluent is benzyl alcohol.

25. The cross-linked polymer of claim 1, further comprising a pigment selected from the group consisting of rutile titanium dioxide, anatase titanium dioxide, calcium carbonate, silica, talc, clay, mica, iron oxide, quinacridone, hansa yellow, diarylide orange toner, phthalocyanine green, phthalocyanine blue, carbon black, lampblack, aluminum powder, stainless steel powder, and mixtures thereof.

26. The cross-linked polymer of claim 1, wherein said polymerizable composition further comprises a sufficient amount of a hydrophobic fumed silica thixotropic agent to provide said uncured pipelining with an as-applied mixed viscosity of about 400–800 centipoise.

* * * * *

UNITED STATES PATENT AND TRADEMARK OFFICE
CERTIFICATE OF CORRECTION

PATENT NO. : 5,707,702

DATED : Jan. 13, 1998

INVENTOR(S) : Robert F. Brady and James D. Adkins

It is certified that error appears in the above-identified patent and that said Letters Patent is hereby corrected as shown below:

On the title page,
Item 56, after last line, add

-- Attorney, Agent, or Firm -- Thomas E. McDonnell; Barry A. Edelberg

Signed and Sealed this

Twenty-sixth Day of May, 1998

Attest:

BRUCE LEHMAN

Attesting Officer

Commissioner of Patents and Trademarks